April 24, 1928. 1,667,608
W. J. STAHMANN
MACHINE FOR STERILIZING COTTON SEED
Filed Jan. 11, 1926
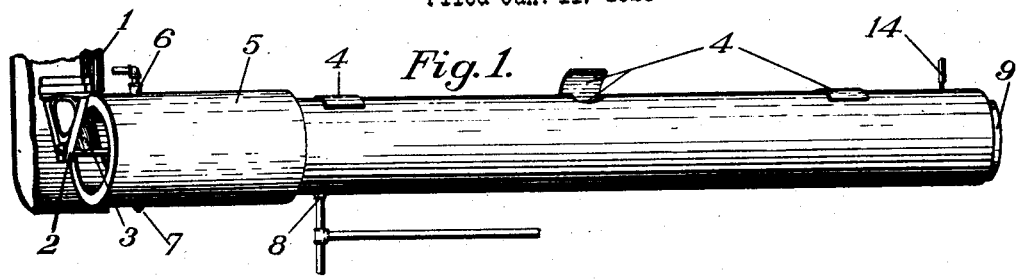
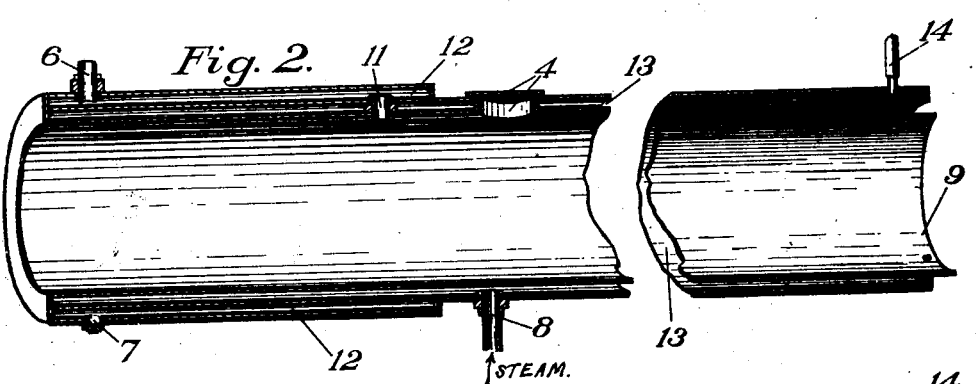
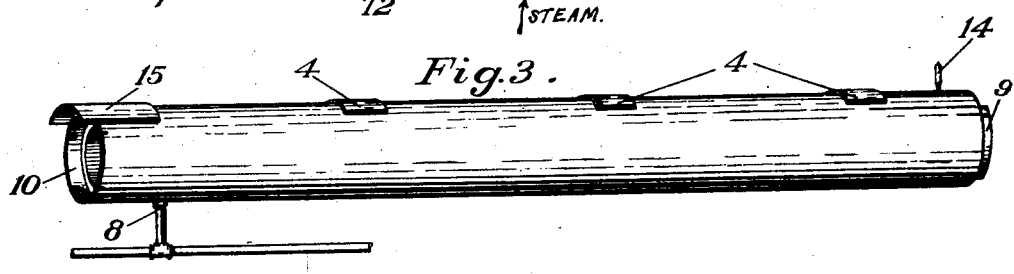
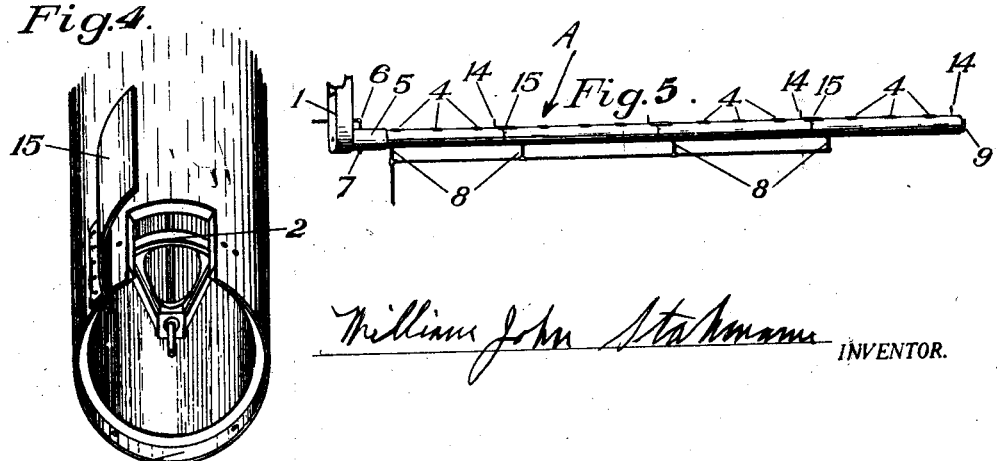
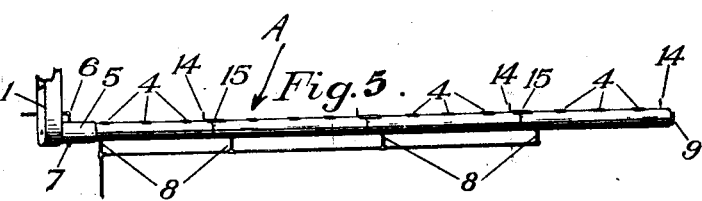
William John Stahmann INVENTOR.

Patented Apr. 24, 1928.

1,667,608

UNITED STATES PATENT OFFICE.

WILLIAM JOHN STAHMANN, OF EL PASO, TEXAS.

MACHINE FOR STERILIZING COTTONSEED.

Application filed January 11, 1926. Serial No. 80,604.

This invention relates to a device for sterilizing cottonseed while in process of ginning, the general object of the invention being to provide a conveyor including a casing and an auger, the casing being provided with a jacket into which steam is introduced so as to heat the seeds as they pass through the conveyor and thus sterilize the same, with a second jacket surrounding portion of the first jacket and in communication with the interior of the casing so that when a liquid is introduced into the second jacket, it will be vaporized and the vapor will enter the casing and thus moisten the seeds.

A further object of the invention is to form the conveyor casing in sections, each section having a flange at one end for engaging a socket in the adjacent section.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a perspective view of the first section of the conveyor.

Figure 2 is a longitudinal sectional view through this section.

Figure 3 is a perspective view of an intermediate section.

Figure 4 is a perspective view of the front end of the first section, showing the means for supporting the auger shaft and the door for closing the opening for providing access to such means.

Figure 5 is a side view of the complete device.

In these drawings, A indicates the conveyor casing which is formed in sections and 1 indicates the trough or hopper which introduces the seeds into the front end of the first section. The numeral 2 indicates one of the hangers for supporting the shaft of the auger or spiral 3 which causes the seeds to pass through the casing in the usual manner. The casing is formed with clean-out openings in its top which are closed by the doors 4. One end of each section is formed with a flange 9 for engaging a socket 10 in the adjacent section for connecting the sections together and each section is formed with a jacket 13 into which steam is introduced through a pipe 8 which is connected with a suitable source of supply. A casing 5 surrounds the front end of the first section and forms a vapor chamber 12 between itself and the outer wall of the jacket 13. Water or other liquid is introduced into this vapor chamber 12 by the pipe 6 and said chamber 12 is in communication with the interior of the casing by means of the nipple 11 so that the liquid vaporized in the chamber from the heat of the steam jacket will pass into the casing through the nipple 11 and thus moisten the seeds passing through the casing. By removing the pipe 6, an opening is left so that sediments that may accumulate in the chamber 12 may be removed. The numeral 7 indicates a clean-out plug for the same purpose.

An air vent 14 is provided for each steam jacket and an opening is formed in the front end of the first section, closed by a door 15, for providing access to the front end of the auger shaft to permit oiling of the bearing thereof.

From the foregoing it will be seen that the seeds are heated as they pass through the conveyor by the steam in the jackets of the sections and said seeds are also moistened by the vapor entering the first section from the vapor chamber 2, the liquid introduced into this chamber being vaporized by the heat from the steam in the jacket. This vaporizer eliminates the use of the steam jet direct from the boiler and it enables a perfect sterilization of the seeds to be obtained, even though the steam pressure from the supply connected with the jacket varies.

What I claim is:

1. In combination with a cotton seed conveying pipe and its auger, a jacket surrounding the pipe, means for introducing steam into the jacket for heating the pipe and the auger, a second jacket surrounding a part of the first jacket, means for placing the second jacket in communication with the pipe and means for introducing liquid into the second jacket so that it will be vaporized by the heat from the first jacket and the resulting vapor will pass into the pipe.

2. A cotton seed conveyor comprising a conveyor pipe formed in sections, each section having a socket at one end and a flange at its other end fitting in the socket of an adjacent section, a jacket surrounding each section, means for introducing steam into each jacket for heating the pipe and a conveyor auger passing through the sections.

WILLIAM JOHN STAHMANN.